Figure 1:
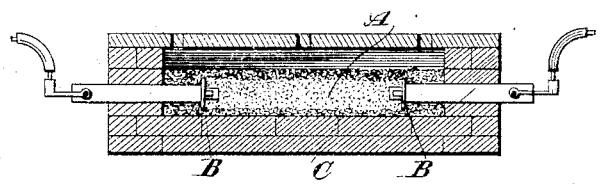

(No Model.)

J. C. HOBBS.
METHOD OF OPERATING ELECTRIC FURNACES.

No. 403,752. Patented May 21, 1889.

Witnesses
Wm M Monroe
Irene C Corey

Inventor.
John C. Hobbs
by
H. T. Fisher
Attorney.

UNITED STATES PATENT OFFICE.

JOHN C. HOBBS, OF LOCKPORT, NEW YORK.

METHOD OF OPERATING ELECTRIC FURNACES.

SPECIFICATION forming part of Letters Patent No. 403,752, dated May 21, 1889.

Application filed August 31, 1888. Serial No. 284,230. (No model.)

*To all whom it may concern:*

Be it known that I, JOHN C. HOBBS, a citizen of the United States, residing at Lockport, in the county of Niagara and State of New York, have invented certain new and useful Improvements in the Method of Operating Electric Furnaces; and I do hereby declare that the following is a full, clear, and exact description of the invention, which will enable others skilled in the art to which it appertains to make and use the same.

My invention relates to improvements in electric furnaces; and it consists in the use of sawdust or its equivalent as a lining for the furnace in lieu of carbon or charcoal as heretofore employed for this purpose.

In what is known as the "Cowles" process of making aluminum it is necessary to confine the charge within a lining or envelope that offers a higher resistance to the electric current than the charge itself, and at the same time also a high resistance to the passage of heat to the walls of the furnace, thereby protecting the walls and confining the heat as much as possible to the charge. The more perfect this insulating-jacket the better the result, and any improvement in this direction is valuable to the art.

In the process aforesaid as now practiced the lining employed is carbon or finely-comminuted charcoal soaked in lime-water. Originally the carbon or charcoal alone was used; but experience taught that the addition to the charcoal of water impregnated with lime considerably increased the resistance of the coal to the flow of the electrical current as well as to the heat. The composition thus prepared was placed around the charge in the furnace, say about two and a half inches thick at the sides and ten inches at the ends.

Other advantages gained by the use of sawdust are:

First. Cleanliness. The charcoal after being subjected to the intense heat of the furnace becomes an impalpable powder, filling the works and making it disagreeable for every one around the works. This objection is wholly avoided by the use of sawdust.

Second. The scarcity of charcoal. The difficulty of getting charcoal in sufficient quantity and of suitable quality is a serious objection and drawback to its use.

Third. The sawdust bakes itself into a solid body at the bottom of the furnace within an hour after the furnace is started. This is a great advantage, because it enables the tapping of the furnace from the bottom without danger of clogging, as is the case with charcoal. Attempts have been made to tap in this way when charcoal was used, but they had to be abandoned on account of clogging, as stated; hence to get the metal out of the furnace after the run was made it was necessary to allow the whole interior of the furnace time to cool off, so that the metal became solidified and could be handled with tongs. The consequence was that all this raw material taken out of the furnace after each charge had to be remelted in crucibles in order to get it into marketable shape. This involved a great expense in labor, cost of coke and crucibles, and the like, all of which is saved by the use of sawdust.

Figure 2:
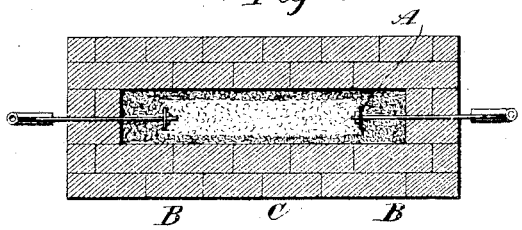

Referring to the drawings, Figure 1 is a transverse section, and Fig. 2 a horizontal section of an electric furnace in which my invention is embodied.

A represents the charge in the furnace. B are the electrodes at the ends of the charge, and C the lining or envelope of sawdust which surrounds the charge.

Of course, wood cut into fine particles in any other way than as sawdust would answer the same purpose.

Having thus described my invention, what I claim as new, and desire to secure by Letters Patent, is—

The method of operating an electric furnace of the kind described, which consists in enveloping or covering the charge with wood cut into small pieces, as sawdust, and then passing a current through the charge, whereby the wood is carbonized, substantially as set forth.

JOHN C. HOBBS.

Witnesses:
N. H. FREEMAN,
FREDERIC H. POMROY.